(12) United States Patent
Ishikawa et al.

(10) Patent No.: US 9,600,224 B2
(45) Date of Patent: Mar. 21, 2017

(54) COMMODITY INFORMATION BROWSING SYSTEM, SERVER APPARATUS, AND CONTROL PROGRAM

(71) Applicant: TOSHIBA TEC KABUSHIKI KAISHA, Shinagawa-ku, Tokyo (JP)

(72) Inventors: Seiji Ishikawa, Kanagawa (JP); Shuji Takahashi, Shizuoka (JP); Kenya Suzuki, Shizuoka (JP); Ryu Morita, Shizuoka (JP); Hiroki Mochizuki, Shizuoka (JP); Yoshihiko Ikeda, Shizuoka (JP); Kazuya Nambu, Tokyo (JP); Kazunari Kogure, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 95 days.

(21) Appl. No.: 14/630,811

(22) Filed: Feb. 25, 2015

(65) Prior Publication Data

US 2015/0248863 A1    Sep. 3, 2015

(30) Foreign Application Priority Data

Feb. 28, 2014    (JP) ................................ 2014-038846

(51) Int. Cl.
*G09G 5/00*    (2006.01)
*G06F 3/147*    (2006.01)

(52) U.S. Cl.
CPC ......... *G06F 3/147* (2013.01); *G09G 2354/00* (2013.01); *G09G 2370/022* (2013.01); *G09G 2370/16* (2013.01); *G09G 2380/04* (2013.01)

(58) Field of Classification Search
CPC .............. G06F 3/147; G09G 2370/022; G09G 2354/00; G09G 2370/16; G09G 2380/04; G09G 2380/06; G09G 3/20
See application file for complete search history.

(56) References Cited

U.S. PATENT DOCUMENTS

| 2002/0002421 | A1* | 1/2002 | Murofushi | ............. G06F 3/147 |
| | | | | 700/214 |
| 2010/0161452 | A1* | 6/2010 | Hiruma | ................ G06Q 10/087 |
| | | | | 705/28 |

(Continued)

FOREIGN PATENT DOCUMENTS

JP    2013-058141    3/2013

*Primary Examiner* — Adam R Giesy
(74) *Attorney, Agent, or Firm* — Amin, Turocy & Watson LLP

(57) ABSTRACT

According to one embodiment, a commodity information browsing system includes a shelf label apparatus including a first storing section and a first transmitting section, a portable terminal including a first receiving section, a notifying section, a second receiving section, and a display section, and a server apparatus including a second storing section and a second transmitting section. The first transmitting section transmits, by radio, one shelf label code among a plurality of shelf label codes. The notifying section notifies the server apparatus of the shelf label code. The second storing section stores association information representing a relation between the shelf label codes and commodity information. The second transmitting section determines, on the basis of the association information, the commodity information associated with the notified shelf label code and transmits the relevant commodity information to the portable terminal. The display section displays an image based on the commodity information.

4 Claims, 9 Drawing Sheets

(56) References Cited

U.S. PATENT DOCUMENTS

| | | | |
|---|---|---|---|
| 2010/0245085 A1* | 9/2010 | Mochizuki | G06Q 10/087 340/540 |
| 2012/0226556 A1* | 9/2012 | Itagaki | G07G 1/0081 705/14.64 |
| 2014/0310129 A1* | 10/2014 | Martin | G06F 3/147 705/26.61 |
| 2015/0108213 A1* | 4/2015 | Sasaki | G06Q 30/0633 235/383 |
| 2015/0199942 A1* | 7/2015 | Mochizuki | G06F 3/1431 345/531 |

* cited by examiner

COMMODITY INFORMATION BROWSING SYSTEM, SERVER APPARATUS, AND CONTROL PROGRAM

CROSS-REFERENCE TO RELATED APPLICATION

This application is based upon and claims the benefit of priority from Japanese Patent Application No. 2014-038846, filed Feb. 28, 2014, the entire contents of which are incorporated herein by reference.

FIELD

Embodiments described herein relate generally to a commodity information browsing system, a server apparatus, and a control program.

BACKGROUND

A shelf label apparatus (an electronic shelf label) that displays commodity information such as sales prices of commodities using an electronic display device such as electronic paper is actively used.

However, the shelf label apparatus of this type is desired to be small in size, low in price, and low in power consumption because of characteristics in operation thereof. Under such circumstances, the display device is limited in size and sometimes cannot display sufficient commodity information.

Therefore, it is demanded that commodity information more than commodity information displayable by the display device included in the shelf label apparatus can be presented to customers.

A problem to be solved by the invention is to provide a commodity information browsing system, a server apparatus, and a control program that make it possible to present to customers commodity information more than commodity information displayable on a display device included in a shelf label apparatus.

DETAILED DESCRIPTION

In general, according to one embodiment, a commodity information browsing system includes a shelf label apparatus, a portable terminal, and a server apparatus. The shelf label apparatus includes a first storing section and a first transmitting section. The portable terminal includes a first receiving section, a notifying section, a second receiving section, and a display section. The server apparatus includes a second storing section and a second transmitting section. The first storing section stores one of shelf label codes for respectively identifying a plurality of the shelf label apparatuses. The first transmitting section transmits, by radio, the shelf label code stored by the first storing section. The first receiving section receives the shelf label code transmitted by the first transmitting section. The notifying section notifies the server apparatus of the shelf label code received by the first receiving section. The second storing section stores association information representing a relation between the shelf label codes and commodity information concerning commodities displayed in a display shelf attached with the shelf label apparatuses identified by the shelf label codes. The second transmitting section determines, on the basis of the association information stored in the second storing section, the commodity information associated with the shelf label code notified by the notifying section and transmits the relevant commodity information to the portable terminal. The second receiving section receives the commodity information transmitted by the second transmitting section. The display section displays an image based on the commodity information received by the second receiving section.

Several embodiments are explained below with reference to the drawings.

First Embodiment

Figure 1:
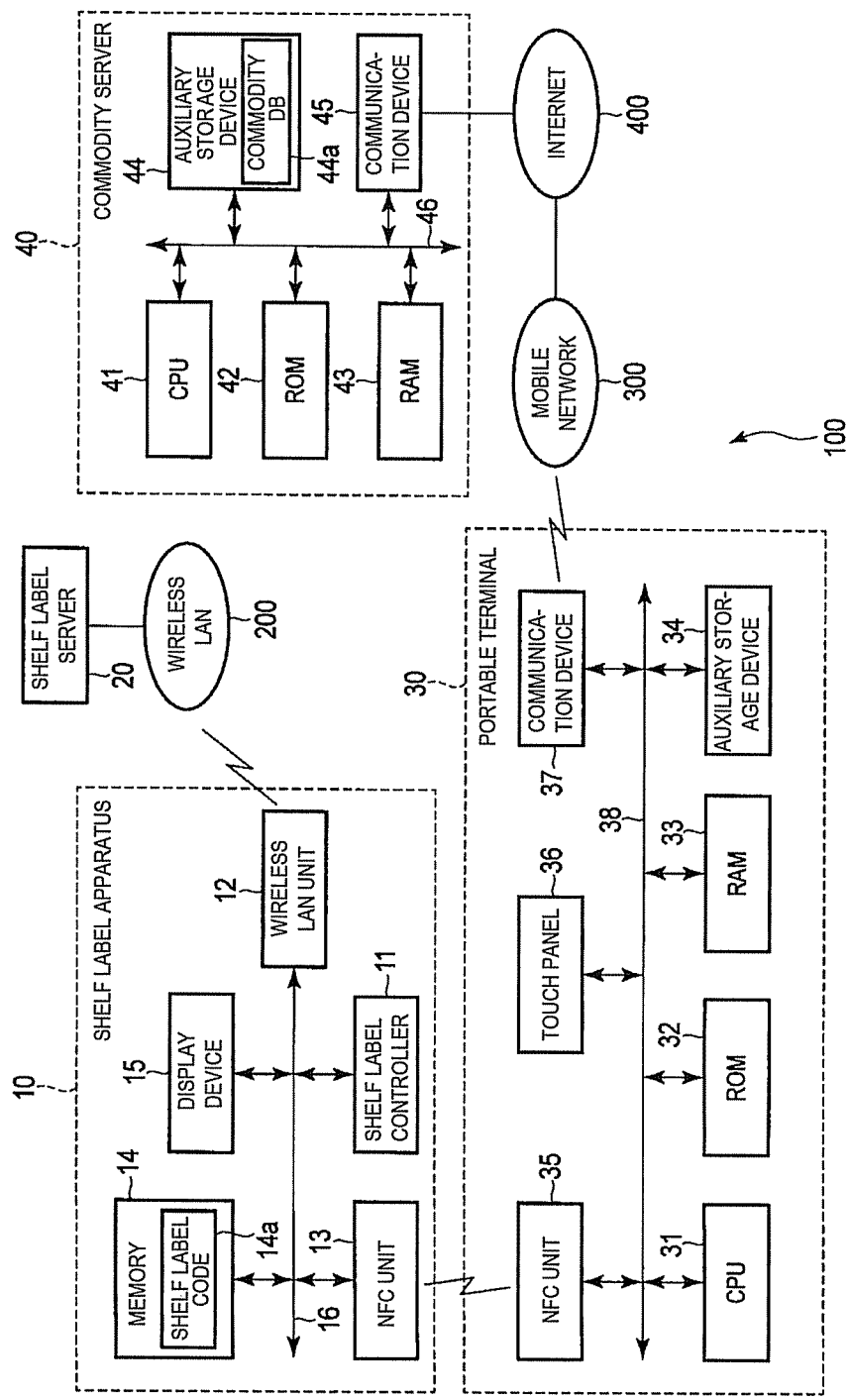
FIG. 1 is a block diagram of a commodity information browsing system according to a first embodiment.

FIG. 1 is a block diagram of a commodity information browsing system 100 according to a first embodiment.

The commodity information browsing system 100 includes a plurality of shelf label apparatuses 10, a shelf label server 20, a portable terminal 30, and a commodity server 40. Note that, in FIG. 1, only one shelf label apparatus 10 is shown.

The shelf label apparatus 10 is attached to a display shelf to correspond to each of a plurality of commodities displayed on the display shelf.

The shelf label server 20 is set in an office or the like of a store. The shelf label server 20 manages each of the plurality of shelf label apparatuses 10 via a wireless LAN (local area network) 200.

The portable terminal 30 includes a data communication function provided via a mobile network 300 and a data communication function by NFC (near field communication). The portable terminal 30 is used by a customer to browse commodity information.

The commodity server 40 distributes the commodity information to be browsed by the customer in the portable terminal 30 to the portable terminal 30 via the mobile network 300 and the Internet 400.

The shelf label apparatus 10 includes a shelf label controller 11, a wireless LAN unit 12, an NFC unit 13, a memory 14, a display device 15, and a transmission system 16.

The shelf label controller 11 is configured using a computer including a CPU (central processing unit), a ROM (read-only memory), and a RAM (random-access memory). The shelf label controller 11 controls the sections of the shelf label apparatus 10 in order to realize expected functions of the shelf label apparatus 10.

The wireless LAN unit 12 performs data communication with the shelf label server 20 via the wireless LAN 200.

The NFC unit 13 performs data communication by the NFC with the portable terminal 30 brought close to the shelf label apparatus 10.

The memory 14 is a nonvolatile data storage device. The memory 14 stores a shelf label code 14a, which is one of shelf label codes respectively set to be capable of indentifying the plurality of shelf label apparatuses 10. Thus, the memory 14 is an example of the first storing section.

The display device 15 is capable of changing display contents under the control by the shelf label controller 11. As the display device 15, for example, electronic paper can be used.

The transmission system 16 transmits data among the shelf label controller 11, the wireless LAN unit 12, the NFC unit 13, the memory 14, and the display device 15. The transmission system 16 may be a well-known transmission system including various buses such as a system bus and various interface circuits that connect the buses and the sections of the shelf label apparatus 10.

The portable terminal 30 includes a CPU 31, a ROM 32, a RAM 33, an auxiliary storage device 34, an NFC unit 35, a touch panel 36, a communication device 37, and a transmission system 38. The transmission system 38 transmits data among the CPU 31, the ROM 32, the RAM 33, the auxiliary storage device 34, the NFC unit 35, the touch panel 36, and the communication device 37. The transmission system 38 may be a well-known transmission system including various buses such as a system bus and various interface circuits that connect the buses and the sections of the portable terminal 30.

The CPU 31, the ROM 32, the RAM 33, and the auxiliary storage device 34 are connected by the transmission system 38 to configure a computer.

The CPU 31 is a nucleus part of the computer. The CPU 31 executes, on the basis of an operating system stored in the ROM 32 and application programs stored in the ROM 32 or the auxiliary storage device 34, control processing for realizing expected functions of the portable terminal 30. The expected functions may be, for example, well-known functions of an existing smart phone. The expected functions are functions realized by control processing explained below.

The ROM 32 is a main storage part of the computer. The ROM 32 stores the operating system and the application programs. The ROM 32 sometimes stores data that the CPU 31 refers to in performing various kinds of processing.

The RAM 33 is a main storage part of the computer. The RAM 33 stores data that the CPU 31 refers to in performing the various kinds of processing. Further, the RAM 33 is used as a so-called work area in which data that the CPU 31 temporarily uses in performing the various kinds of processing is stored in advance.

The auxiliary storage device 34 is an auxiliary storage part of the computer. The auxiliary storage device 34 stores the application programs, data that the CPU 31 uses in performing the various kinds of processing, or data generated by the processing in the CPU 31.

The NFC unit 35 performs data communication by the NFC with the NFC unit 13 when the portable terminal 30 is brought close to the shelf label apparatus 10.

The touch panel 36 includes a display device and a touch sensor. The display device displays any screen such as a GUI screen. As the display device, for example, a well-known device such as a color LCD (liquid crystal display) can be used. The touch sensor is disposed over a display surface of the display device. The touch sensor detects a touch position of a user on the display surface of the display device and sends information concerning the position to the CPU 31. As the touch sensor, a well-known device can be used.

The communication device 37 performs communication via the mobile network 300. The communication device 37 can also communicate with the commodity server 40 via the mobile network 300 and the Internet 400.

As hardware of the portable terminal 30, a device in which an application program can be installable in any way such as an existing smart phone or tablet terminal can be directly used. In the auxiliary storage device 34 included in the device of this type, a control program, which is an application program described concerning control processing explained below, is installed by a seller or a user of the device. Consequently, the portable terminal 30 is realized. The control program is distributed to the seller or the user by being recorded in a removable recording medium such as a magnetic disk, a magneto-optical disk, an optical disk, or a semiconductor memory or via a network. Note that the control program may be stored in the ROM 32.

The commodity server 40 includes a CPU 41, a ROM 42, a RAM 43, an auxiliary storage device 44, a communication device 45, and a transmission system 46. The transmission system 46 transmits data among the CPU 41, the ROM 42, the RAM 43, the auxiliary storage device 44, and the communication device 45. The transmission system 46 may be a well-known transmission system including various buses such as a system bus and various interface circuits that connect the busses and the sections of the commodity server 40.

The CPU 41, the ROM 42, the RAM 43, and the auxiliary storage device 44 are connected by the transmission system 46 to configure a computer.

The CPU 41 is a nucleus part of the computer. The CPU 41 executes, on the basis of an operating system stored in the ROM 42 and application programs stored in the ROM 42 or the auxiliary storage device 44, control processing for realizing expected functions of the commodity server. One of the expected functions is a function realized by control processing explained below.

The ROM 42 is a main storage part of the computer. The ROM 42 stores the operating system and the application programs. The ROM 42 sometimes stores data that the CPU 41 refers to in performing various kinds of processing.

The RAM 43 is a main storage part of the computer. The RAM 43 stores data that the CPU 41 refers to in performing the various kinds of processing. Further, the RAM 43 is used as a so-called work area in which data that the CPU 41 temporarily uses in performing the various kinds of processing is stored in advance.

The auxiliary storage device 44 is an auxiliary storage part of the computer. The auxiliary storage device 44 stores the application programs, data that the CPU 41 uses in performing the various kinds of processing, or data generated by the processing in the CPU 41. The auxiliary storage device stores a commodity database (commodity DB) 44a.

The commodity database 44a is a set of data records in which file paths are associated with shelf label codes. The file paths represent storage places and file names of data files including commodity information concerning commodities displayed on a display shelf attached with the shelf label apparatuses 10 identified by shelf label codes associated with the file paths. Note that the storage places may be places in the auxiliary storage device 44 or may be places in a not-shown storage device accessible via the Internet 400. The data record included in the commodity database 44a is an example of the association information. Thus, the auxiliary storage device 44 is an example of the second storing section.

The communication device 45 performs communication via the Internet 400. The communication device 45 can also perform communication with the portable terminal 30 via the Internet 400 and the mobile network 300.

As hardware of the commodity server 40, for example, a general-purpose server apparatus or computer apparatus can be used. In the auxiliary storage device 44 included in the apparatus of this type, a control program, which is an application program described concerning control processing explained below, is installed by a seller or a user of the apparatus and the commodity database 44a is written. Consequently, the commodity server 40 is realized. The control program is distributed to the seller or the user by being recorded in a removable recording medium such as a magnetic disk, a magneto-optical disk, an optical disk, or a semiconductor memory or via a network. Note that the control program may be stored in the ROM 42.

Figure 2:
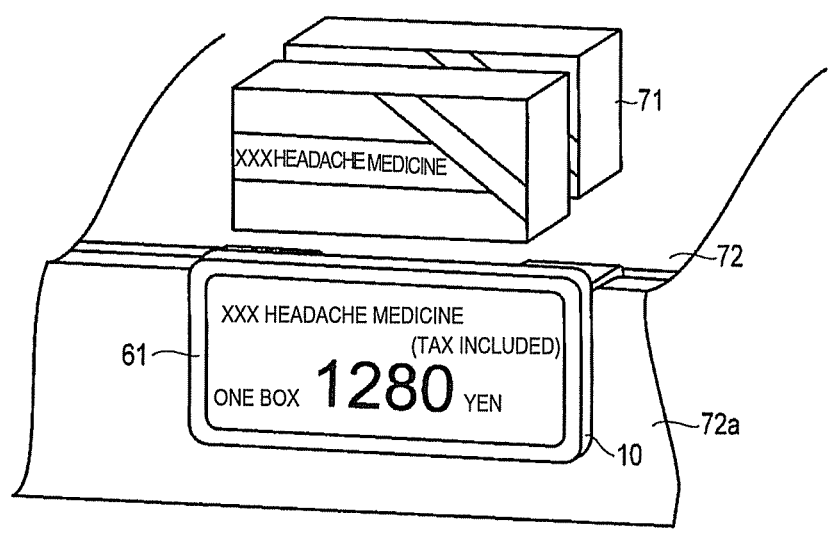
FIG. 2 is a perspective view of the external appearance of a shelf label apparatus shown in FIG. 1.

FIG. 2 is a perspective view of the external appearance of the shelf label apparatus 10 that is displaying a shelf label image 61 as an example.

As shown in FIG. 2, the shelf label apparatus 10 is attached to a front edge 72a of a display shelf 72 in which a commodity 71 is displayed. The shelf label image 61 shows a commodity name and a sales price.

The operation of the commodity information browsing system 100 explained above is explained below. Note that content of processing explained below is an example. Various kinds of processing capable of obtaining the same result can be used as appropriate.

In the portable terminal 30, when operation for requesting the start of an application based on the control program stored in the auxiliary storage device 34 as explained above is performed, for example, on the touch panel 36, the CPU 31 starts control processing based on the control program.

Figure 3:
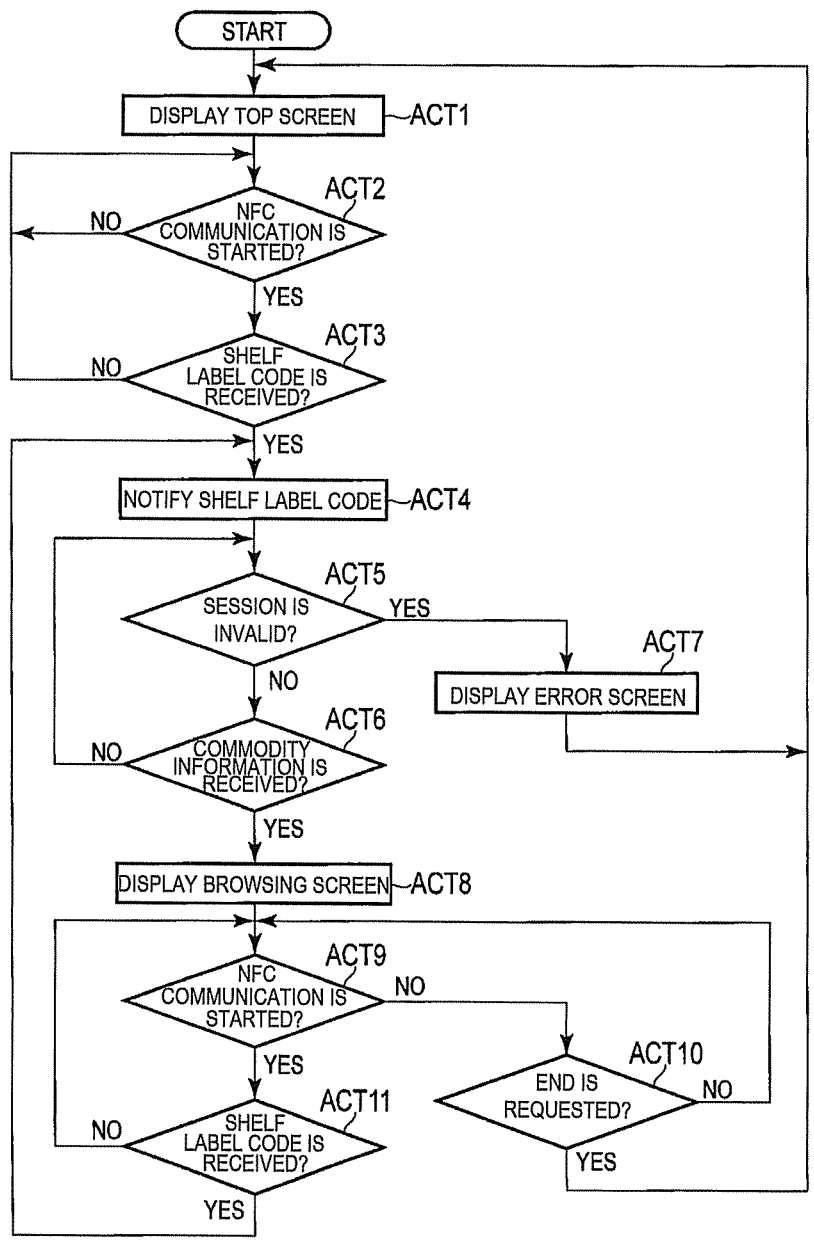
FIG. 3 is a flowchart of control processing in the first embodiment of a CPU included in a portable terminal shown in FIG. 1.

FIG. 3 is a flowchart of the control processing in the first embodiment of the CPU 31.

In Act 1, the CPU 31 controls the touch panel 36 to display a predetermined top screen. The touch panel 36 displays the top screen under the control by the CPU 31. The top screen is, for example, a screen for urging a customer to bring the portable terminal 30 close to a shelf label apparatus attached to a display shelf in which a commodity, commodity information of which the customer desires to check, is displayed.

In Act 2, the CPU 31 determines whether NFC communication by the NFC unit 35 is started. If the CPU 31 determines that the NFC communication is not started (NO in Act 2), the CPU 31 repeats Act 2. Thus, in Act 2, the CPU 31 waits for the NFC communication to be started.

When the customer brings the portable terminal 30 close to the shelf label apparatus 10, the NFC unit 35 starts radio communication between the NFC unit 35 and the NFC unit 13. At this point, the shelf label apparatus 10 transmits the shelf label code 14a stored by the memory 14 from the NFC unit 13 by radio under the control by the shelf label controller 11. The NFC unit 35 receives the shelf label code 14a transmitted by radio in this way. Thus, the function of the first transmitting section is attained by cooperation of the shelf label controller 11 and the NFC unit 13. The NFC unit 35 is an example of the first receiving section.

Since the NFC communication is started, the CPU 31 determines that the NFC communication is started (YES in Act 2) and proceeds to Act 3.

In Act 3, the CPU 31 determines whether data received by the NFC unit 35 is a shelf label code. In communication performed by the NFC unit 35 using the NFC, reception of data other than the shelf label code could also be performed. Therefore, if such communication for another use is performed and the shelf label code is not received, the CPU 31 determines that the data received by the NFC unit 35 is not the shelf label code (NO in Act 3) and returns to a waiting state in Act 2. However, if the NFC communication with the shelf label apparatus 10 is performed and the shelf label code is received, the CPU 31 determines that the data received by the NFC unit 35 is the shelf label code (YES in Act 3) and proceeds to Act 4.

In Act 4, the CPU 31 notifies the commodity server 40 of the received shelf label code. The CPU 31 only has to perform this notification by accessing the commodity server 40 with the communication device 37 using, for example, a URL obtained by adding the shelf label code to the end of a URL for specifying the commodity server 40 in the Internet 400. Alternatively, a method of the notification may be any method such as a method of transferring the shelf label code from the portable terminal 30 to the commodity server 40 after a session between the portable terminal 30 and the commodity server 40 is established. Thus, the communication device 37 is an example of a communication device that communicates with the server apparatus. The CPU 31 executes the control processing on the basis of the control program, whereby the computer including the CPU 31 as the nucleus part functions as the notification control section. The function of the communication section is realized by cooperation of the computer and the communication device 37.

When the commodity server 40 is started, the CPU 41 starts control processing according to the control program stored in the auxiliary storage device 44.

Figure 4:
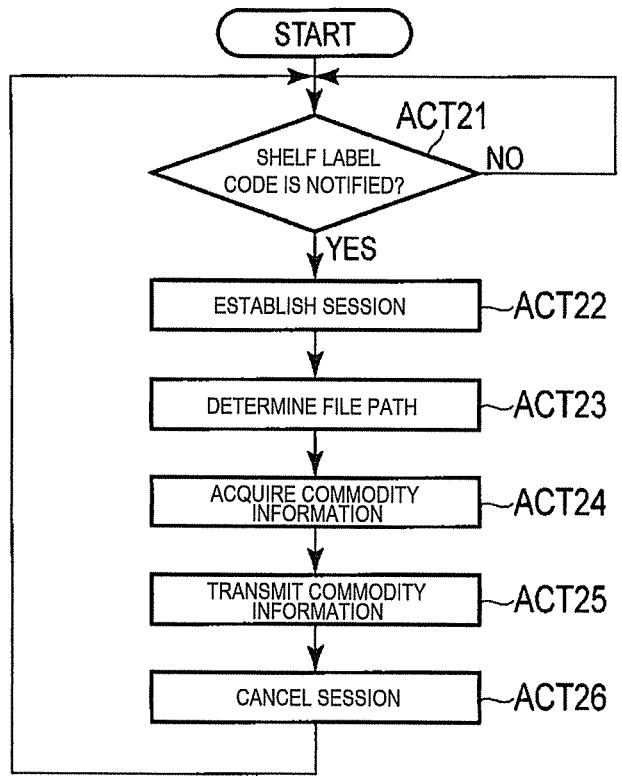
FIG. 4 is a flowchart of control processing in the first embodiment of a CPU in a commodity server shown in FIG. 1.

FIG. 4 is a flowchart of the control processing in the first embodiment of the CPU 41.

In Act 21, the CPU 41 determines whether a shelf label code is notified. If the CPU 41 determines that the shelf label code is not notified (NO in Act 21), the CPU 41 repeats Act 21. Thus, in Act 21, the CPU 41 waits for the shelf label code to be notified. If the shelf label code is notified from the portable terminal 30 as explained above, the CPU 41 determines that the shelf label code is notified (YES in Act 21) and proceeds to Act 22.

In Act 22, the CPU 41 establishes a session with the portable terminal 30.

In Act 23, the CPU 41 searches through the commodity database 44a with the notified shelf label code as a key and determines a file path associated with the shelf label code.

In Act 24, the CPU 41 acquires a data file specified by the determined file path, that is, commodity information associated with the shelf label code.

In Act 25, the CPU 41 transmits the acquired commodity information to the portable terminal 30 via the session established in Act 22. Thus, the CPU 41 executes the control processing on the basis of the control program, whereby the computer including the CPU 41 as the nucleus part functions as the second transmitting section.

In Act 26, the CPU 41 cancels the session established in Act 22. Thereafter, the CPU 41 returns to the waiting state in Act 21.

In this way, the commodity information associated with the shelf label code for identifying the shelf label apparatus 10, to which the portable terminal 30 is brought close, is transmitted from the commodity server 40 to the portable terminal 30. When the commodity information is transmitted to the portable terminal 30 via the Internet 400 and the mobile network 300, the communication device 37 receives the commodity information and writes the commodity information in the auxiliary storage device 34. Thus, the communication device 37 is an example of the second receiving section.

In the portable terminal 30, after notifying the shelf label code in Act 4 in FIG. 3, the CPU 31 proceeds to Act 5.

In Act 5, the CPU 31 determines whether the established session is invalidated according to the notification of the shelf label code. If the CPU 31 determines that the established session is not invalidated (NO in Act 5), the CPU 31 proceeds to Act 6.

In Act 6, the CPU 31 determines whether the commodity information transmitted from the commodity server 40 as explained above is received by the communication device 37. If the CPU 31 determines that the commodity information is not received (NO in Act 6), the CPU 31 returns to Act 5.

Thus, the CPU 31 waits for the session to be invalidated or the commodity information to be received in Act 5 or 6. If the commodity information is not received and the session is invalidated, the CPU 31 determines that the established session is invalidated (YES in Act 5) and proceeds to Act 7.

In Act 7, the CPU 31 controls the touch panel 36 to display a predetermined error screen. The error screen is a screen for notifying the customer that information concerning a commodity cannot be displayed because of occurrence of abnormality. The CPU 31 causes the touch panel 36 to display the error screen in a predetermined fixed period or a period until operation for instructing the end of the display of the error screen is performed on the touch panel 36 or the like. If the period for displaying the error screen ends, the CPU 31 returns to Act 1 and repeats the same processing. Thus, the touch panel 36 transitions to a state in which the top screen is displayed. The display of the error screen is ended.

In the waiting state in Acts 5 and 6, if the commodity information is received as explained above, the CPU 31 determines that the commodity information is received (YES in Act 6) and proceeds to Act 8.

In Act 8, the CPU 31 controls the touch panel 36 to display a browsing screen based on the commodity information stored in the auxiliary storage device 34. Specifically, it is conceivable that the commodity information is, for example, an HTML file that defines a browsing screen showing information concerning a commodity. In this case, the CPU 31 develops the browsing screen on the basis of the commodity information and causes the touch panel 36 to display the browsing screen. Alternatively, it is conceivable that the commodity information is, for example, a set of a plurality of kinds of element information concerning a commodity such as a commodity name and a sales price. In this case, the CPU 31 arranges each of the kinds of element information included in the commodity information on a predetermined form of the browsing screen, develops the browsing screen, and causes the touch panel 36 to display the browsing screen. Thus, the touch panel 36 is an example of the display device that displays an image based on the commodity information. The CPU 31 executes the control processing on the basis of the control program, whereby the computer including the CPU 31 as the nucleus part functions as the display control section. The function of the display section is realized by cooperation of the computer and the touch panel 36.

Figure 5:
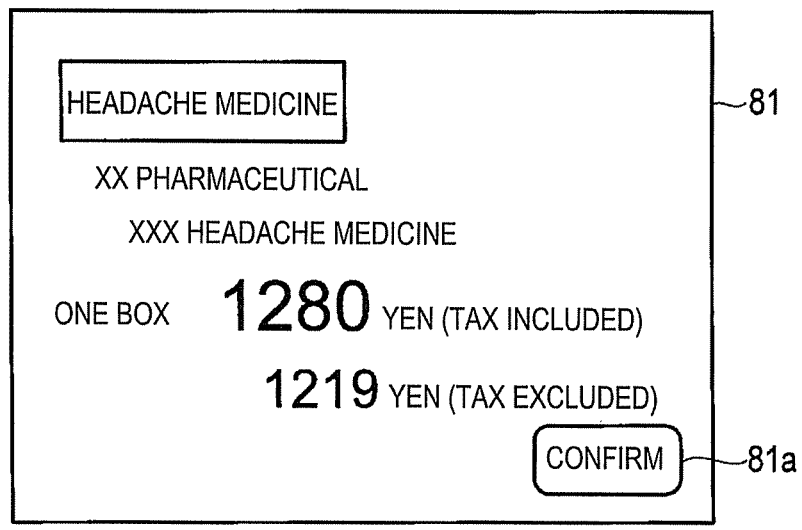
FIG. 5 is a diagram showing a browsing screen as an example in the first embodiment.

FIG. 5 is a diagram showing a browsing screen 81 as an example.

The browsing screen 81 is displayed when the portable terminal 30 is brought close to the shelf label apparatus 10 in the state shown in FIG. 2. The browsing screen 81 shows a type, a manufacturer, a commodity name, and a sales price of the commodity 71. That is, the browsing screen 81 shows the type and the manufacturer in addition to the display information in the shelf label apparatus 10 shown in FIG. 2. The browsing screen 81 includes a check button 81a. The check button 81a is a button for instructing the end of the display of the browsing screen 81.

In Act 9, the CPU 31 determines whether new NFC communication is started. If the CPU 31 determines that the new NFC communication is not started (NO in Act 9), the CPU 31 proceeds to Act 10.

In Act 10, the CPU 31 determines whether operation for instructing the end of the display of the browsing screen 81 such as a touch on the check button 81a is performed on the touch panel 36 or the like. If the relevant operation is not performed, the CPU 31 returns to Act 9.

Thus, the CPU 31 waits for the NFC communication to be started or the end of the display of the browsing screen 81 to be instructed in Act 9 or 10. If the operation for instructing the end of the display of the browsing screen 81 is performed, the CPU 31 determined that the operation for instructing the end of the display of the browsing screen 81 is performed (YES in Act 10), returns to Act 1, and repeats the same processing. Thus, the touch panel 36 transitions to the state in which the top screen is displayed. The display of the browsing screen 81 is ended.

When the customer desires to check information concerning another commodity, the customer may bring the portable terminal 30, which returns to the state in which the top screen is displayed, close to the shelf label apparatus 10 attached to a display shelf of the commodity. However, the customer may bring the portable terminal 30, on which the browsing screen 81 is kept displayed, close to the shelf label apparatus 10. In the latter case, new NFC communication is started if the CPU 31 is in the waiting state in Acts 9 and 10. In this case, the CPU 31 determines that the new NFC communication is started (YES in Act 9) and proceeds to Act 11.

In Act 11, the CPU 31 determines whether data received by the NFC unit 35 is a shelf label code. If the shelf label code is not received, the CPU 31 determines that the data is not the shelf label code (NO inAct 11) and returns to the waiting state in Acts 9 and 10. However, if the NFC communication with the shelf label apparatus 10 is performed and the shelf label code is received, the CPU 31 determines that the data is the shelf label code (YES in Act 11), shifts to Act 4, and repeats the processing in Act 4 and subsequent acts as explained above. Consequently, the browsing screen 81 is updated to content based on commodity information associated with the shelf label apparatus 10 to which the portable terminal 30 is brought close as explained above.

As explained above, with the commodity information browsing system 100, it is possible to cause the customer to browse, on the touch panel 36 included in the portable terminal 30, the commodity information associated with the shelf label apparatus 10. In general, the touch panel 36 is excellent in visibility and capable of displaying a large number of kinds of information compared with the display device 15. Therefore, the touch panel 36 is used as an auxiliary display device of the shelf label apparatus 10 to present the commodity information to the customer. It is possible to present the customer with kinds of information more than kinds of information that can be displayed on the display device 15.

Note that the commodity server 40 manages the commodity information in association with the shelf label codes. Therefore, the shelf label apparatus 10 only has to always transmit the same shelf label code irrespective of association between shelf labels and commodities. The portable terminal 30 only has to simply notify the commodity server 40 of the shelf label code transmitted by the shelf label apparatus 10 in this way. If the association of the shelf labels and the commodities is changed, the commodity database 44a only has to be corrected.

As a secondary effect by the commodity information browsing system 100, it is possible to improve a display environment of a store. That is, since supplementary information presentation can be performed in the portable terminal 30, it is possible to minimize display information in the shelf label apparatus 10. Consequently, it is possible to improve visibility of display on the shelf label apparatus 10. Conventionally, auxiliary display is sometimes performed by attaching a pop to the shelf label apparatus 10. When a large number of pops are arranged on a display shelf, the display shelf is sometimes disordered. However, if information displayed in the pop is displayed on the portable terminal 30, it is possible to prevent the attachment of the pop. It is possible to put the display shelf in order.

The customer only has to bring the portable terminal 30 close to the shelf label apparatus 10 after starting a predetermined application in the portable terminal 30. Complicated operation is unnecessary for browsing of commodity information.

Second Embodiment

Figure 6:
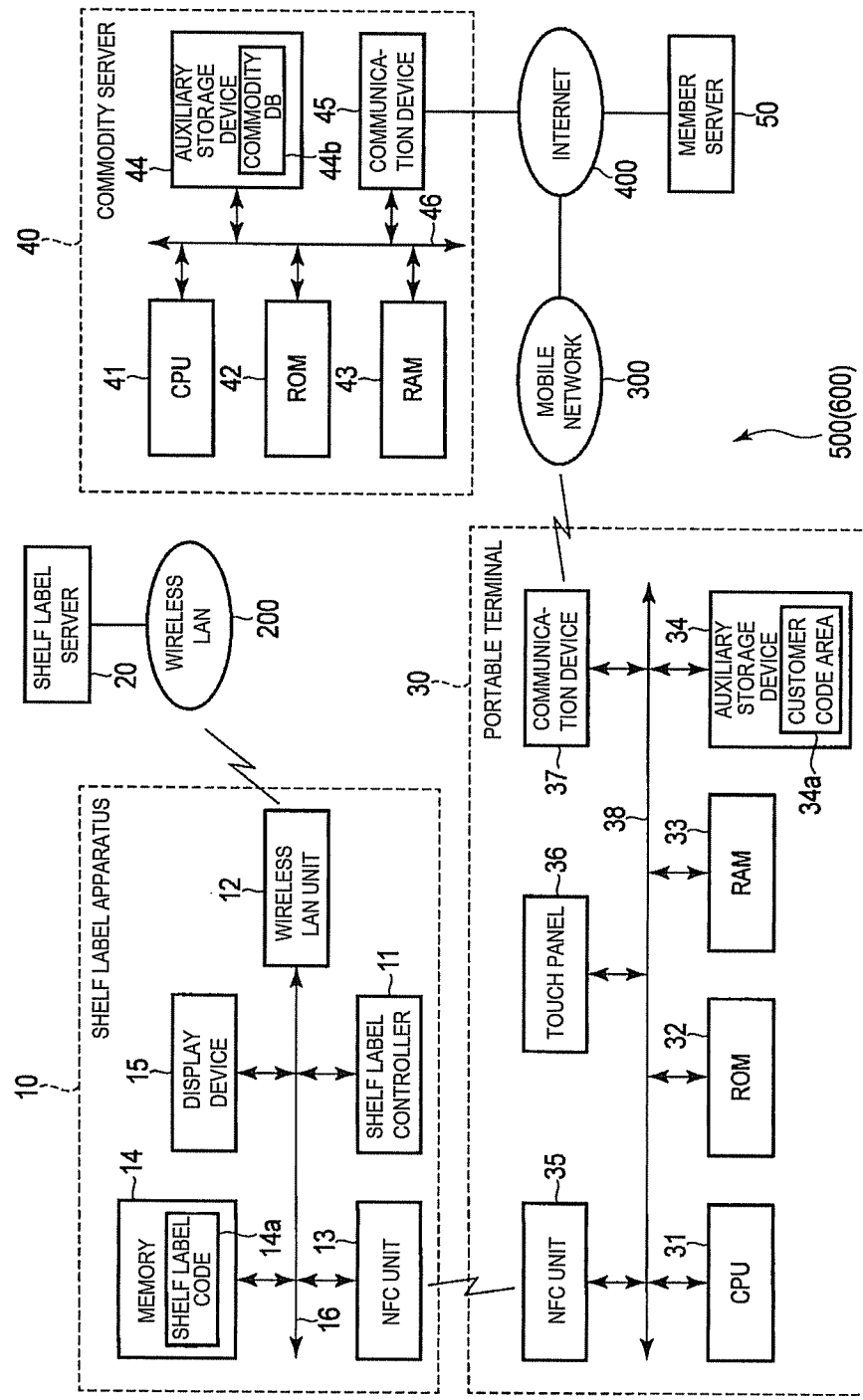
FIG. 6 is a block diagram of a commodity information browsing system according to second and third embodiments.

FIG. 6 is a block diagram of a commodity information browsing system 500 according to a second embodiment. Note that, in FIG. 6, components same as the components shown in FIG. 1 are denoted by the same reference numerals and signs. Detailed explanation of the components is omitted.

The commodity information browsing system 500 includes a member server 50 in addition to the plurality of shelf label apparatuses 10, the shelf label server 20, the portable terminal 30, and the commodity server 40.

The member server 50 manages a customer database in which information concerning customers is stored in association with customer codes for identifying respective customers registered as members.

A hardware configuration of the portable terminal 30 is similar to the hardware configuration in the first embodiment. However, a customer code area 34a is set in the auxiliary storage device 34. If a customer using the portable terminal 30 is registered as a member, the customer code area 34a stores a customer code of the customer.

In the portable terminal 30, a control program stored by the auxiliary storage device 34 or the ROM 32 is different from the control program in the first embodiment.

A hardware configuration of the commodity server 40 is similar to the hardware configuration in the first embodiment. However, the auxiliary storage device 44 stores a commodity database 44b instead of the commodity database 44a.

The commodity database 44b is a set of data records in which member file paths and non-member file paths are respectively associated with shelf label codes. The member file paths represent storage places and filenames of data files including commodity information for member customers. The non-member file paths represent storage places and file names of data files including commodity information for non-member general customers. However, the commodity database 44b may include data records in which member file paths and non-member file paths are the same.

In the commodity server 40, a control program stored by the auxiliary storage device 44 or the ROM 42 is different from the control program in the first embodiment.

Concerning the operation of the commodity information browsing system 500, differences from the operation of the commodity information browsing system 100 are mainly explained below. Note that content of processing explained below is an example. Various kinds of processing capable of obtaining the same result can be used as appropriate.

Figure 7:
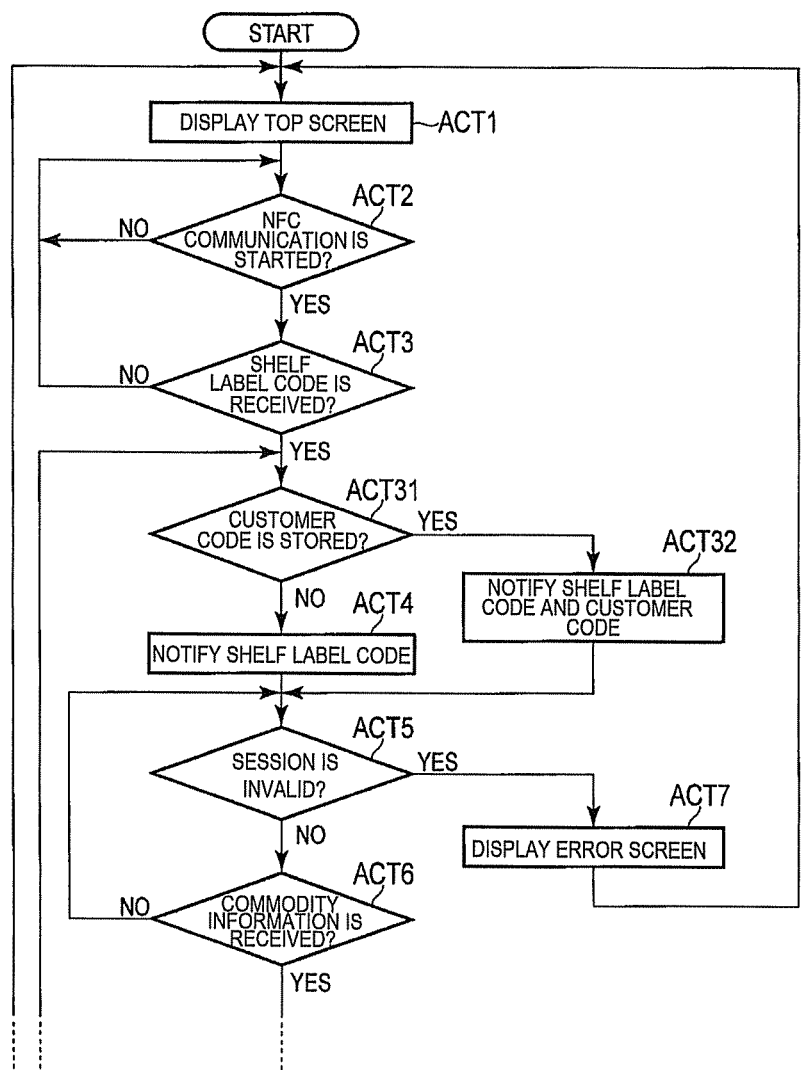
FIG. 7 is a flowchart of control processing in the second embodiment of a CPU included in a portable terminal shown in FIG. 6.

FIG. 7 is a flowchart of control processing in the second embodiment of the CPU 31. Note that a part of processing same as the processing in FIG. 3 is not shown in the figure. The same kinds of processing are denoted by the same reference signs. Explanation of the kinds of processing is omitted.

If the CPU 31 determines that a shelf label code is received by NFC communication (YES in Act 3), the CPU 31 proceeds to Act 31.

In Act 31, the CPU 31 determines whether a customer code is stored in the customer code area 34a. If the CPU 31 determines that the customer code is not stored (NO in Act 31), the CPU 31 proceeds to Act 4 and notifies the commodity server 40 of only the shelf label code. However, if the CPU 31 determines that the customer code is stored (YES in Act 31), the CPU 31 proceeds to Act 32.

In Act 32, the CPU 31 notifies the commodity server 40 of the received shelf label code and the customer code stored in the customer code area 34a. Thereafter, the CPU 31 shifts to the waiting state in Acts 5 and 6.

Figure 8:
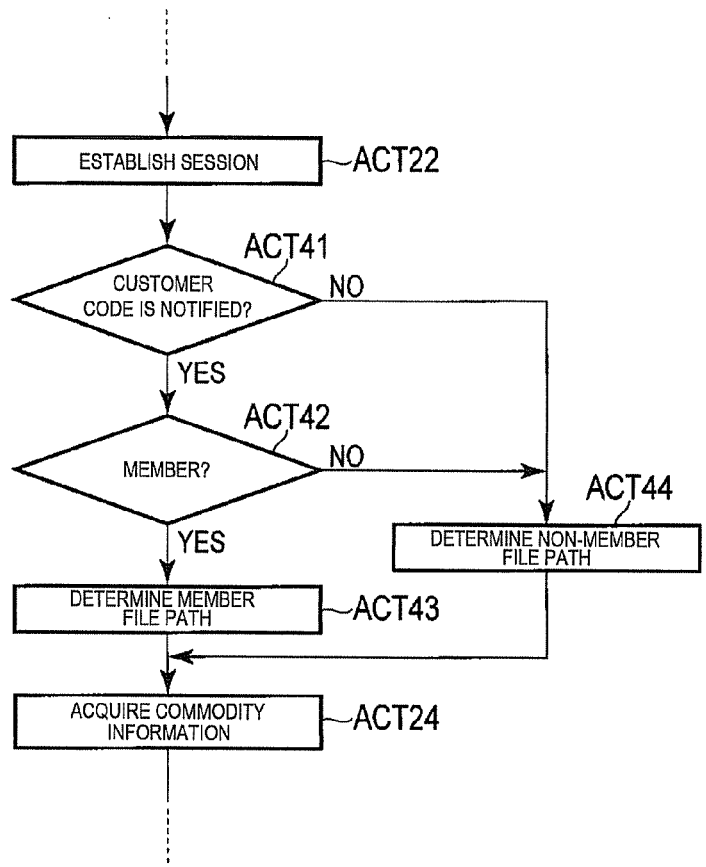
FIG. 8 is a flowchart of control processing in the second embodiment of a CPU included in a commodity server shown in FIG. 6.

FIG. 8 is a flowchart of control processing in the second embodiment of the CPU 41. Note that a part of processing same as the processing in FIG. 4 is not shown in the figure. The same kinds of processing are denoted by the same reference signs. Explanation of the kinds of processing is omitted.

If the CPU 41 fishes establishing the session in Act 22, the CPU 41 proceeds to Act 41.

In Act 41, the CPU 41 determines whether a customer code is notified together with the shelf label code. If the CPU 41 determines that the customer code is notified (YES in Act 41), the CPU 41 proceeds to Act 42.

In Act 42, the CPU 41 inquires the member server 50 and confirms whether a customer identified by the notified customer code is a member. If the CPU 41 can confirm that the customer is a member, the CPU 41 determines that the customer is the member (YES in Act 42) and proceeds to Act 43.

In Act 43, the CPU 41 searches through the commodity database with the notified shelf label code as a key and determines a member file path associated with the shelf label code. Thereafter, the CPU 41 proceeds to Act 24.

On the other hand, if the CPU 41 determines that the customer code is not notified (NO in Act 41) and if the CPU 41 determines that the customer is not a member (NO in Act 42), the CPU 41 proceeds to Act 44.

In Act 44, the CPU 41 searches through the commodity database with the notified shelf label code as a key and determines a non-member file path associated with the shelf label code. Thereafter, the CPU 41 proceeds to Act 24.

In Act 24, the CPU 41 acquires a data file specified by the file path acquired in Act 43 or Act 44, that is, commodity information for members or non-members associated with the shelf label code.

As explained above, with the commodity information browsing system 500, an effect same as the effect of the commodity information browsing system 100 can be attained.

Further, with the commodity information browsing system 500, even when the portable terminal 30 is brought close to the same shelf label apparatus 10, content of a browsing screen can be varied depending on whether the customer using the portable terminal 30 is registered as a member or not registered as a member.

Figure 9:
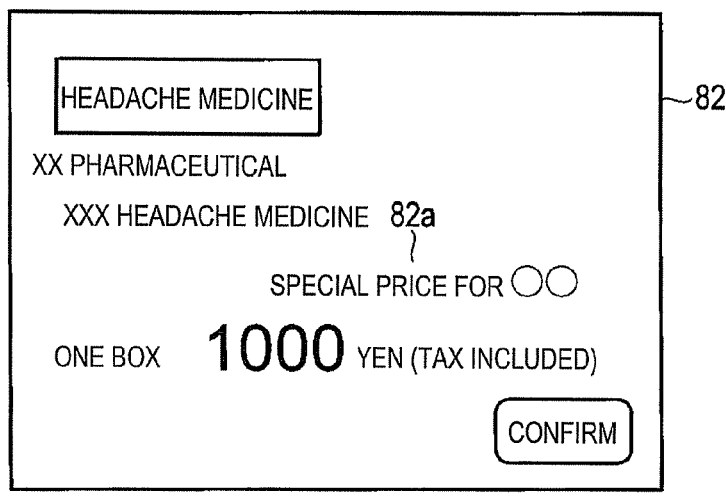
FIG. 9 is a diagram showing a browsing screen as an example in the second embodiment.

FIG. 9 is a diagram showing a browsing screen 82 as an example based on the commodity information for members.

If the commodity information for members is transmitted from the commodity server 40 to the portable terminal 30, for example, the browsing screen 82 shown in FIG. 9 is displayed on the touch panel 36. On the other hand, if the commodity information for non-members is transmitted from the commodity server 40 to the portable terminal 30, for example, the browsing screen 81 shown in FIG. 5 is displayed on the touch panel 36.

In the browsing screen 82, a character string 82a is added to the browsing screen 81 and a sales price is a special price. Circles in the character string 82a actually represent a name of a customer and indicate that the sales price is the special price for the customer.

As explained above, it is possible to perform operation for displaying limited commodity information for members on the touch panel 36 of the portable terminal 30 while displaying general commodity information for non-members on the display device 15 of the shelf label apparatus 10. It is possible to appropriately present a customer with information required by the customer.

As a secondary effect by the commodity information browsing system 500, sales promotion through stimulation of a desire to buy of a customer is possible. That is, commodity information for members such as a special price for members is not displayed on the shelf label apparatus 10 and is displayed only on the portable terminal 30. Therefore, it is possible to strongly impress the customer with favorable treatment. Consequently, it is possible to stimulate a desire to buy of the customer.

Third Embodiment

A block diagram of a commodity information browsing system 600 according to a third embodiment is the same as the block diagram of the commodity information browsing system 500. Therefore, illustration and explanation of the block diagram are omitted.

The commodity information browsing system 600 includes the plurality of shelf label apparatuses 10, the shelf label server 20, the portable terminal 30, the commodity server 40, and the member server 50.

In the commodity server 40, a control program stored by the auxiliary storage device 44 or the ROM 42 is different from the control program in the second embodiment.

The member server 50 manages individual information in association with customer codes of member customers. The individual information represents, concerning each of a large number of commodities, setting about which of commodity information for members and commodity information for non-members is used for presentation and setting about individual display for each customer.

Concerning the operation of the commodity information browsing system 600, differences from the operation of the commodity information browsing system 500 are mainly explained. Note that content of processing explained below is an example. Various kinds of processing that can obtain the same result can be used as appropriate.

The operation of the commodity information browsing system 600 is different from the operation of the commodity information browsing system 500 in apart of control processing by the CPU 41.

Figure 10:
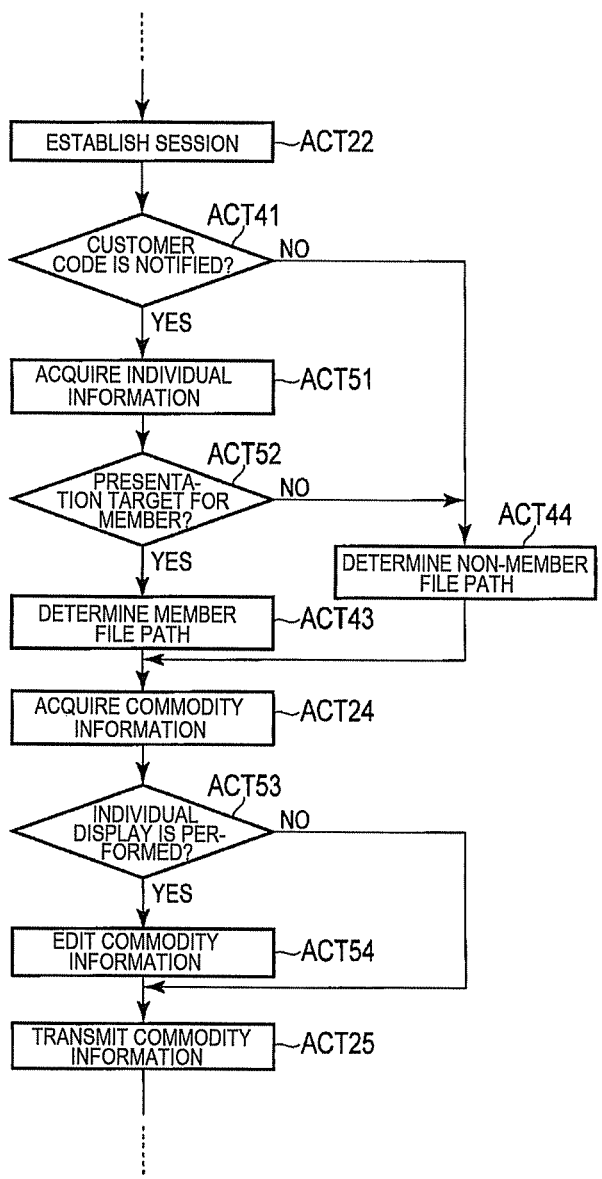
FIG. 10 is a flowchart of control processing in the third embodiment of the CPU included in the commodity server shown in FIG. 6.

FIG. 10 is a flowchart of control processing in the third embodiment of the CPU 41. Note that a part of processing same as the processing in FIG. 4 is not shown in the figure. Kinds of processing same as the kinds of processing in FIGS. 4 and 8 are denoted by the same reference signs. Explanation of the kinds of processing is omitted.

If the CPU 41 determines that a customer code is notified (YES in Act 41), the CPU 41 proceeds to Act 51.

In Act 51, the CPU 41 acquires, from the member server 50, individual information associated with the notified customer code. At this point, the CPU 41 may acquire all of the individual information associated with the customer code or may acquire, in the individual information associated with the customer code, only information concerning a commodity displayed on a display shelf attached with a shelf label identified the shelf label code.

In Act 52, the CPU 41 determines on the basis of the individual information acquired as explained above whether a customer identified by the customer code is a target of presentation of commodity information for members. If the CPU 41 determines that the customer is the target of presentation of the commodity information for members (YES in Act 52), the CPU 41 proceeds to Act 43. If the CPU 41 determines that the customer is not the target of presentation of the commodity information for members (NO in Act 52), the CPU 41 proceeds to Act 44.

Therefore, if the CPU 41 finishes acquiring the commodity information in Act 24, the CPU 41 proceeds to Act 53.

In Act 53, the CPU 41 determines on the basis of the individual information whether individual display for each customer is performed. If the CPU 41 determines that the individual display for each customer is performed (YES in Act 53), the CPU 41 proceeds to Act 54.

In Act 54, the CPU 41 edits the commodity information acquired in Act 24 to cause the portable terminal 30 to perform the individual display for each customer based on the individual information. Thereafter, the CPU 41 shifts to Act 25 and transmits the edited commodity information.

Note that, if the CPU 41 determines that the individual display for each customer is not performed (NO in Act 53), the CPU 41 passes Act 54 and proceeds to Act 25. In this case, the CPU 41 directly transmits the commodity information acquired in Act 24.

As explained above, with the commodity information browsing system 600, an effect same as the effect of the commodity information browsing system 500 can be attained.

Further, with the commodity information browsing system 600, even when the portable terminal 30 is brought close to the same shelf label apparatus 10, it is possible to vary content of a browsing screen according to a customer who uses the portable terminal 30.

Figure 11:
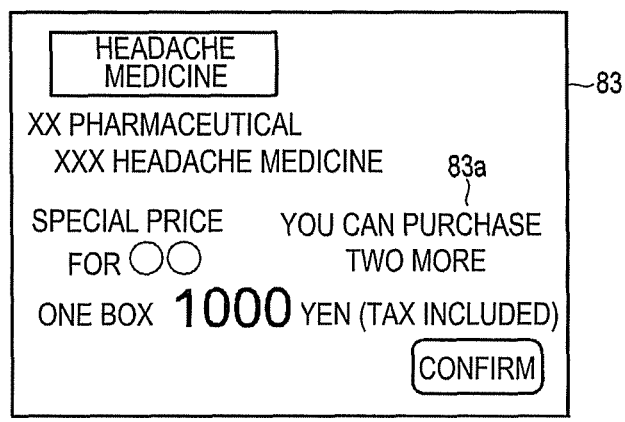
FIG. 11 is a diagram showing a browsing screen as an example in the third embodiment.

FIG. 11 is a diagram showing a browsing screen 83 as an example including the individual display for each customer.

The browsing screen 83 is based on commodity information edited to add a character string 83a to the browsing screen 82 and show the character string 83a.

In order to cause the portable terminal 30 to display the browsing screen 83, for example, the member server 50 manages results of shopping of members in cooperation with, for example, a not-shown POS (point-of-sale) system. When individual information concerning "xxx headache medicine" is requested from the commodity server 40, the member server 50 only has to determine the character string 83a as representing a number obtained by subtracting, from a limit number for applying a special price to "xxx headache medicine", the number of purchased commodities determined from the results and transmit individual information including the character string 83a to the commodity server 40.

As explained above, in the display device 15 of the shelf label apparatus 10, it is possible to perform operation for displaying limited commodity information for members and for each customer on the touch panel 36 of the portable terminal while displaying general commodity information for non-members. It is possible to appropriately present a customer with information required by the customer.

As a secondary effect by the commodity information browsing system 600, sales promotion through stimulation of a desire to buy of a customer is possible. That is, commodity information corresponding to respective situations of the customer is displayed only on the portable terminal 30. Therefore, it is possible to strongly impress the customer with favorable treatment. Consequently, it is possible to stimulate a desire to buy of the customer.

Various modifications of the embodiments are possible as explained below.

In the embodiments, the shelf label server 20 and the commodity server 40 may be integrated into a single server apparatus.

In the second and third embodiments, the commodity server 40 and the member server 50 may be integrated into a single server apparatus.

In the second embodiment, if the CPU 41 determines that the customer is the member (YES in Act 42), the CPU 41 may determine whether a member file path is present and, if the member file path is present, proceed to Act 43 and, if the member file path is absent, proceed to Act 44. Consequently, if the same browsing screen should be displayed for members and non-members because, for example, a special price or the like is not set concerning a relevant commodity, commodity information for members does not have to be prepared.

In the third embodiment, the information displayed on the browsing screen on the basis of the individual information may be any information that changes for each customer in any way such as an expiration date of a special price.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity information browsing system comprising:
   a plurality of shelf label apparatuses;
   a portable terminal; and
   a server apparatus
   wherein each of the shelf label apparatuses including:
      a first storing section configured to store one of shelf label codes for respectively identifying the plurality of shelf label apparatuses; and
      a first transmitting section configured to transmit, by radio, the shelf label code stored by the first storing section,
   the portable terminal including:
      a first receiving section configured to receive the shelf label code transmitted by the first transmitting section; and
      a notifying section configured to notify the server apparatus of the shelf label code received by the first receiving section,
   the server apparatus including:
      a second storing section configured to store association information representing a relation between the shelf label codes and commodity information concerning commodities displayed in a display shelf attached with the shelf label apparatuses identified by the shelf label codes; and
      a second transmitting section configured to determine, on the basis of the association information stored in the second storing section, the commodity information associated with the shelf label code notified by the notifying section and transmit the relevant commodity information to the portable terminal, and
   the portable terminal further including:
      a second receiving section configured to receive the commodity information transmitted by the second transmitting section; and
      a display section configured to display an image based on the commodity information received by the second receiving section, wherein
   the notifying section further notifies the server apparatus of customer codes for identifying respective customers,
   the second storing section stores the association information representing association between the shelf label codes and the commodity information or association between combinations of the shelf label codes and the customer codes and the commodity information, and
   if the association information concerning a combination of the shelf label code and the customer code notified by the notifying section is stored in the second storing section, the second transmitting section transmits the commodity information indicated by the association information and, if the association information is not stored in the second storing section, the second transmitting section transmits the commodity information indicated by the association information concerning the shelf label code notified by the notifying section.

2. The system according to claim 1, wherein the first transmitting section transmits the shelf label code by radio when the portable terminal is brought close to the shelf label apparatus including the first transmitting section.

3. A server apparatus comprising:
   a storing section configured to store association information representing a relation between shelf label codes for respectively identifying a plurality of shelf label apparatuses and commodity information concerning commodities displayed in a display shelf attached with the shelf label apparatuses identified by the shelf label codes; and a transmitting section configured to determine, on the basis of the association information stored in the storing section, the commodity information associated with the shelf label code notified from a portable terminal and transmit the relevant commodity information to the portable terminal, wherein a notifying section associated with a portable terminal configured to notify the server apparatus of customer codes for identifying respective customers, the storing section stores the association information or associations between combinations of the shelf label codes and the customer codes and the commodity information, and if the association information concerning a combination of shelf label code and a customer code notified by the notifying section is stored in the storing section, the transmitting section transmits the commodity information indicated by the association information and, if the association information is not stored in the storing second, the transmitting section transmits the commodity information indicated by the association information concerning the shelf label code notified by the notifying section.

4. A commodity information browsing method comprising:

facilitating a shelf label apparatus of a plurality of shelf label apparatuses to store shelf label codes for respectively identifying the plurality of shelf label apparatuses, and transmit, by a radio, a shelf label code;

facilitating a portable terminal to receive the shelf label code, and notify a server apparatus of the shelf label code;

facilitating the server apparatus to store association information representing a relation between the shelf label code and commodity information concerning commodities displayed on a display shelf attached to the plurality of shelf label apparatuses identified by the shelf label codes, determine, on the basis of the association information, the commodity information associated with the shelf label code, and transmit the commodity information to the portable terminal;

further facilitating the portable terminal to receive the commodity information;

facilitating display of an image based on the commodity;

further facilitating notifying the server apparatus of customer codes for identifying respective customers;

further facilitating the server apparatus to store association information representing associations between the shelf label codes and the commodity information or associations between combinations of the shelf label codes and the customer codes and the commodity information; and if the association information concerning a combination of the shelf label codes and the customer codes are stored by the server apparatus, facilitating transmission, by the server apparatus, of the commodity information indicated by the association information and, if the association information is not stored by the server apparatus, facilitating transmission, by the server apparatus, of the commodity information indicated by the association information concerning the shelf label code.

* * * * *